United States Patent Office 2,712,558
Patented July 5, 1955

2,712,558
9- AND 10-HYDROXYOCTADECYLAMINES

Robert J. Vander Wal, Chicago, James Harwood, Western Springs, and Richard A. Reck, Chicago, Ill., assignors to Armour and Company, Chicago, Ill., a corporation of Illinois No Drawing. Application February 18, 1950, Serial No. 145,088

1 Claim. (Cl. 260—584)

This invention relates to the preparation of hydroxyamines. The invention is particularly useful in the production of a hydroxyamine having 18 carbon atoms, and in which there is an oxygen-linked ester radical attached to the ninth or tenth carbon atom. The hydroxyamines are useful in forming wax-like compounds and quaternary ammonium compounds.

An object of the invention is to produce as a new product mono-hydroxyamines and a process for preparing the same. Other specific objects and advantages will appear as the specification proceeds.

We have discovered that by employing a critical range of temperatures a hydroxy nitrile of high molecular weight may be effectively hydrogenated so as to produce mono-hydroxyamines in excellent yield and quality.

The usual range of temperatures employed in the hydrogenation of nitriles, etc., is about 100°–120° C. at 50–300 lbs. pressure. Sometimes higher temperatures may be reached before decomposition occurs. We have discovered that there is a higher and critical range that must be employed for the effective hydrogenation of the hydroxy nitriles, and this range is approximately 140°–200° C. The minimum temperature is 150° C. at the same pressure at which ordinary nitriles may be hydrogenated at 100° C. However, we can reduce the temperature to 140° C. by using about 1400 pounds pressure. In the carrying out of the present invention we prefer to employ temperatures of from 140° C. to 200° C., and pressures of approximately 150 to 2,000 pounds.

We prefer to use as a starting material a hydroxy nitrile having 18 carbon atoms and having a hydroxyl or an oxygen-linked ester radical attached to the ninth or tenth carbon atom. This may be produced in any suitable manner.

In the co-pending application of Robert J. Vander Wal, Serial No. 792,353, now Patent No. 2,558,666, for Nitrile Derivatives, there are set out a number of hydroxy nitriles, together with various methods for producing these. For example, as a starting material we may use the products described in said application as an uninterrupted straight chain aliphatic nitrile of at least 18 carbon atoms, selected from the group consisting of

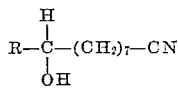

and

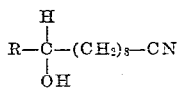

where R is an aliphatic hydrocarbon radical.

Specific hydroxy nitriles, as enumerated in the above application, may be 9-hydroxy stearonitrile, 10-hydroxy stearonitrile, the acetic acid ester of 9-hydroxy stearonitrile or 10-hydroxystearonitrile, the oleoyl ester of 9-hydroxy stearonitrile or 10-hydroxy stearonitrile.

Starting with a hydroxy nitrile as above described, we find that this may be effectively reduced to the amine by hydrogenation in the presence of a hydrogenation catalytic agent when the temperatures are maintained within the critical range of 140°–200° C., and with corresponding pressures ranging between 150 pounds to 2,000 pounds. The hydroxyamine product has been found useful for forming a wax-like compound, and also for forming a quaternary ammonium compound, etc.

The following specific examples must be set out:

Example I 160 parts of a mixture of 9 and 10 hydroxystearonitriles, prepared from red oil nitriles according to the procedure outlined in co-pending application No. 536,617, now abandoned, and distilled, together with 3.2 parts of Raney nickel catalyst and 3.2 parts of 5% sodium hydroxide solution, were subjected to a pressure of 1400 pounds per square inch and a temperature of 140° C. for 4½ hours. The catalyst was removed by filtration and the product was distilled yielding 91.7 parts of a mixture of 9 and 10 hydroxyocetadecylamine having a boiling point of 173–180° C. at 0.35 mm. The residue consisted of 58.5 parts of a mixture of 9 and 10 dihydroxydioctadecylamine which melted at 82–83° C. after crystallization from alcohol.

Example II 150 grams of hydroxystearonitrile, 6 grams of Raney nickel catalyst [50% Ni in water], 3 ml. 5% NaOH were placed in the Parr pressure reaction apparatus. The apparatus was blown twice with 100 pounds of hydrogen to sweep out the air contained therein.

The hydrogenation was carried predominantly at pressures not exceeding 150 p. s. i. and at temperatures ranging from 145 to 150° C. with rapid agitation. During the first 48 minutes, a drop in hydrogen pressure of 70 p. s. i. was observed. A drop of 65 p. s. i. was observed during the next 80 minutes and of 80 p. s. i. during the subsequent 190 minutes. The hydrogen absorbed during the last 60 of the aforementioned 190 minutes was negligible, amounting to a drop of less than 5 p. s. i., showing that the reaction had definitely slowed down if not stopped altogether at the low pressure employed. In order to finish the reduction the hydrogen pressure was increased to 300 p. s. i. and again to 500 p. s. i.

Total hydrogen absorbed at pressure less than 150 p. s. i. was represented by a drop in pressure of 232 p. s. i.

Total hydrogen absorbed at higher pressures of 300 to 500 p. s. i. was represented by a drop in pressure of 75 p. s. i.

The reduction time at the lower pressures was 5 hours and 20 minutes, while at the higher pressures was 3 hours.

The reduced product was removed from the bomb, filtered to remove the suspended catalyst and distilled under reduced pressure.

136.3 grams distilled.
Distillate=87.6 grams, B. P. 170–185 at 0.5 mm., 64.5%.
Residue=44.5 grams, 32.6%.
N. E. of distillate=305.

Example III—Esteramide wax

A one mole quantity of hydroxyoctadecylamine was mixed with a two molar quantity of stearic acid. The mixture was heated slowly up to 250°–260° C. Water evolved and was removed. The product cooled to a soft, waxy solid which melted at 40°–50° C. Analysis showed 13% free fatty acid. The main product was an esteramide.

Example IV.—N.N-dimethylhydroxyoctadecylamine

To a mixture of 21.7 g. of 9-hydroxyoctadecylamine, 11 ml. of H₂O and 3.2 ml. of alcohol, was slowly added 13 ml. of 85% formic acid. The mixture was stirred during the addition and the temperature was not allowed to rise above 80° C. After cooling, 20 ml. of 36% formaldehyde was added and the reaction was allowed to proceed at 60–80° C. The time required was about two hours. When the evolution of carbon dioxide stopped, the solution was made alkaline with sodium hydroxide and the amine separated and dried over sodium carbonate.

*Example V.—Trimethylhydroxyoctadecylammonium chloride*

To 25 grams of dimethylhydroxyoctadecylamine cooled to −30° C. was added a cooled solution of 10 grams of methyl chloride in 40 c. of methanol. The mixture was sealed in a rocking-bomb type autoclave and heated at 130° C. with rocking for 1 hour. The bomb was cooled to room temperature and opened. The excess methyl chloride was allowed to evaporate. The methanol was evaporated by warming the remaining solution on a steam bath, leaving a residue of water-soluble trimethylhydroxyoctadecylammonium chloride.

*Example VI.—Acetoxyoctadecylamine*

A mixture of 50 grams of acetoxyoctadecanenitrile, 1 cc. of 5% sodium hydroxide and 2 grams of 50% Raney nickel was placed in a bomb and hydrogenated at 140° C. and 2000 p. s. i. pressure. In 2 hours there was a pressure drop of 200 p. s. i. The bomb was cooled to 80° C. and the contents were filtered to remove the catalyst. The acetoxyoctadecylamine was distilled; B. P. 160–170° C./1.0 mm. The neutral equivalent was found to be 330; the theoretical for this compound is 327.

While in the foregoing specification we have set out the process steps in considerable detail, it will be understood that such details may be varied by those skilled in the art without departing from the spirit of our invention.

We claim:

A mixture of 9-hydroxyoctadecylamine with 10-hydroxyoctadecylamine.

References Cited in the file of this patent

UNITED STATES PATENTS

| | | |
|---|---|---|
| 2,069,302 | Dreyfus | Feb. 2, 1937 |
| 2,586,325 | Gresham | Feb. 19, 1952 |

OTHER REFERENCES

Carter et al.: J. Biological Chem., 170, pages 295–9 (1947).